UNITED STATES PATENT OFFICE.

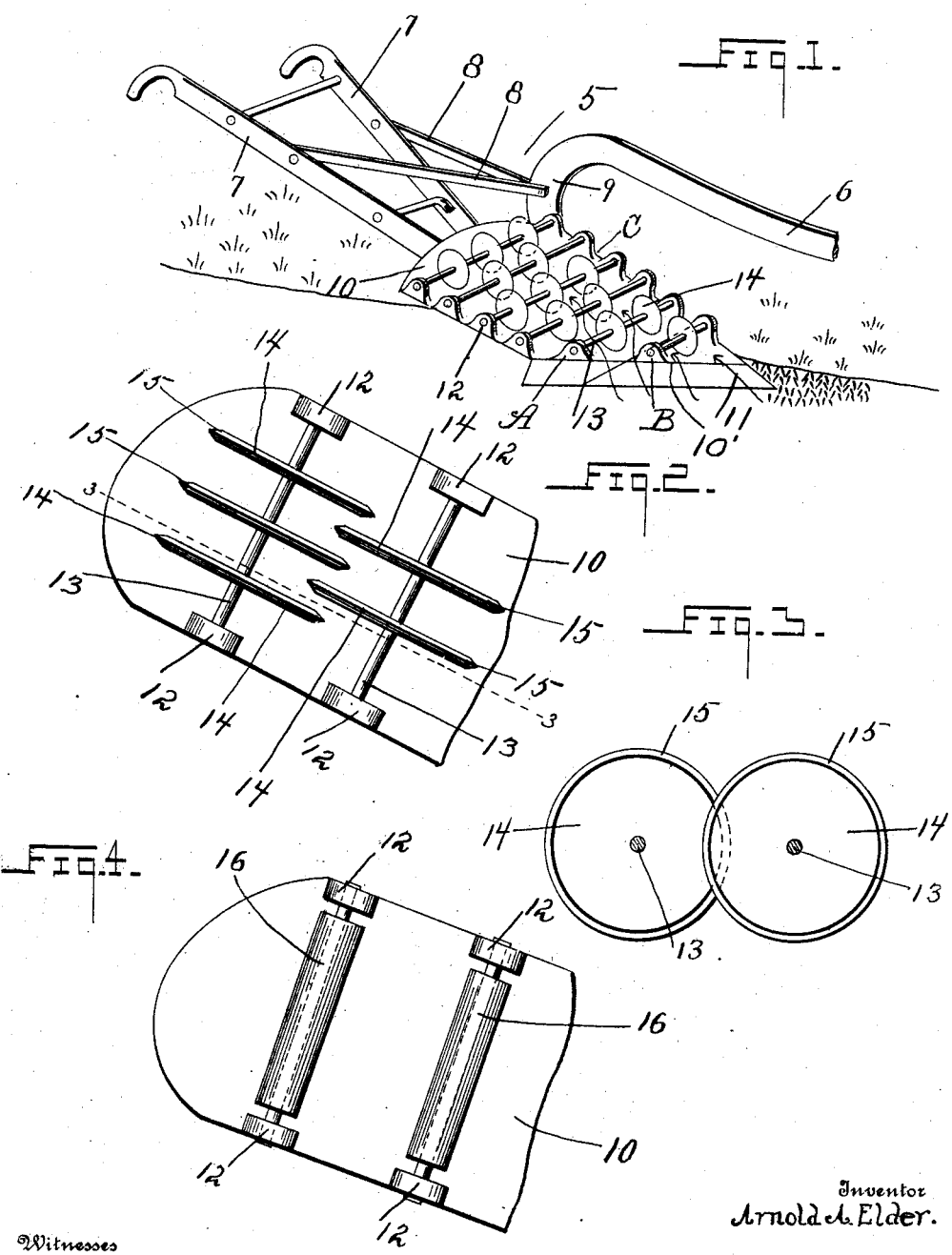
A. A. ELDER.
MOLDBOARD FOR PLOWS.
APPLICATION FILED MAY 21, 1908.
906,786.
Patented Dec. 15, 1908.
Inventor
Arnold A. Elder.

ARNOLD A. ELDER, OF WOODSTON, KANSAS.

MOLDBOARD FOR PLOWS.

No. 906,786.  Specification of Letters Patent.  Patented Dec. 15, 1908.

Application filed May 21, 1908. Serial No. 434,153.

*To all whom it may concern:*

Be it known that I, ARNOLD A. ELDER, a citizen of the United States, residing at Woodston, in the county of Rooks and State of Kansas, have invented certain new and useful Improvements in Moldboards for Plows, of which the following is a specification.

This invention relates to plows or similar agricultural implements but more particularly to mold boards, and has for an object to provide a mold board with a plurality of revoluble disks or rollers whereby soil as it is plowed may pass against the side of the mold board without offering resistance as is common in the ordinary type of mold board.

A further object of this invention is to provide means whereby soil as it is plowed may be effectively pulverized in its travel across the mold board.

Other objects and advantages will be apparent from the following description and it will be understood that changes in the specific structure shown and described may be made within the scope of the claim without departing from the spirit of the invention.

In the drawings forming a portion of this specification, and in which like numerals of reference indicate similar parts in the several views, Figure 1 is a perspective view of a plow showing the application of the present invention to the mold board, Fig. 2 is a detail side elevational view, Fig. 3 is a transverse sectional view on the line 3—3 of Fig. 2, the mold board 10 being omitted, Fig. 4 is a plan of a modified form of the invention.

Referring now more particularly to the drawings, there is shown a plow 5 including the usual beam 6 therefor and spaced handles 7 which are connected to the beam in any suitable manner, and which are braced to the beam by means of diagonal rods 8. The beam 6 is provided with the usual depending portion 9 which thus receives a mold board 10 provided with the usual share 11, as shown. The mold board may be of any suitable construction, and at the upper and lower edges of the mold board there are shown journal boxes 12 arranged with their passages in a diagonal plane, and which thus receive the ends of diagonal shafts 13. Six shafts are shown in the present instance and are arranged in parallel spaced relation. Each shaft is provided with a plurality of fixed disks 14 arranged in spaced relation to each other, and as shown, the disks of one shaft are disposed with portions between the disks of the adjacent shaft. The disks are preferably provided with cutting edges 15.

In the modified form of my invention shown in Fig. 4, the mold board is provided with a plurality of rollers 16 revolubly mounted in a manner substantially the same as that previously described for the disks, and these rollers are also arranged in parallel spaced relation.

It will thus be seen that a plow or agricultural implement may be driven through a field in the ordinary manner, and in its travel it is obvious that soil thrown against the mold board will engage the disks or rollers and effectively pulverize the soil before it is finally discharged. A mold board provided with disks or rollers as herein set forth and described may be used in connection with plows of ordinary construction without change thereto, and it will be understood that a plow may be operated with less number of draft animals, the provision of the rollers being such that little or no resistance is offered against the sides of the mold board as have been common in plows or agricultural implements heretofore. In Fig. 1 the mold board is shown as having spaced ears at its upper and lower edges bent at right angles to form the journals for the reception of the ends of the shafts.

It will be observed that the mold board 10 has a lower diagonal share engaging edge 10', and at this edge there are located a pair of journals indicated at A and B, alining with the two lowermost journals of the upper side edge C of the mold board.

What is claimed is:—

In a plow, the combination with a mold board having a diagonal share engaging edge, of journals carried by the side edges of the mold board, journals carried by the share engaging edge of the mold board, said last named journals registering with those journals of the upper side edge of the mold board which are located adjacent to its forward end, and revoluble members connected with the journals and extending transversely above the mold board.

In testimony whereof I affix my signature, in presence of two witnesses.

ARNOLD A. ELDER.

Witnesses:
F. L. MURPHY,
W. C. BUTTERMORE.